(12) United States Patent
Ares et al.

(10) Patent No.: US 6,895,774 B1
(45) Date of Patent: May 24, 2005

(54) REFRIGERATED AIR DRIER WITH DEHUMIDIFICATION OF BOTH THE LOW PRESSURE AND THE HIGH PRESSURE AIR

(76) Inventors: Roland Ares, 1004 Wedgewood Dr., St. Charles, MO (US) 63303; Aree Poomsanoh, 1/1 M00. 7 Bangkoowad, Muang, Pathumthani (TH) 12000

( * ) Notice: Subject to any disclaimer, the term of this patent is extended or adjusted under 35 U.S.C. 154(b) by 27 days.

(21) Appl. No.: 10/852,922

(22) Filed: May 25, 2004

(51) Int. Cl.⁷ .............................................. F25B 25/00
(52) U.S. Cl. .......................................... 62/332; 62/63
(58) Field of Search ........................... 62/63, 186, 173, 62/272, 332, 333, 411, 412, 426

(56) References Cited

U.S. PATENT DOCUMENTS

| | | | |
|---|---|---|---|
| 3,888,090 A * | 6/1975 | Meyer ........................... | 62/240 |
| 4,094,167 A * | 6/1978 | Madsen ....................... | 62/238.6 |
| 4,474,021 A * | 10/1984 | Harband ........................ | 62/94 |
| 4,679,411 A * | 7/1987 | Pearse, Jr. .................... | 62/519 |
| 5,031,411 A * | 7/1991 | Gehring et al. ................. | 62/93 |
| 5,400,607 A * | 3/1995 | Cayce ............................ | 62/90 |
| 5,564,281 A * | 10/1996 | Calton et al. ................... | 62/90 |
| 5,664,425 A * | 9/1997 | Hyde ............................. | 62/90 |
| 5,826,443 A * | 10/1998 | Ares et al. ................. | 62/324.1 |
| 6,021,644 A * | 2/2000 | Ares et al. ..................... | 62/151 |
| 6,055,818 A * | 5/2000 | Valle et al. .................... | 62/173 |
| 6,205,797 B1 * | 3/2001 | Maeda ........................... | 62/94 |
| 6,370,887 B1 * | 4/2002 | Hachimaki ..................... | 62/94 |

FOREIGN PATENT DOCUMENTS

JP          408200228 A * 8/1996

\* cited by examiner

Primary Examiner—William E. Tapolcai
Assistant Examiner—Mohammad M. Ali
(74) Attorney, Agent, or Firm—Daniel Kramer

(57) ABSTRACT

A three function air dehumidifier for air compressors acting on both the ambient air and the compressed air while employing only finned heat exchangers for cooling and dehumidifying ambient air and for exchanging heat between compressed air streams and between evaporating refrigerant and compressed air streams.

17 Claims, 7 Drawing Sheets

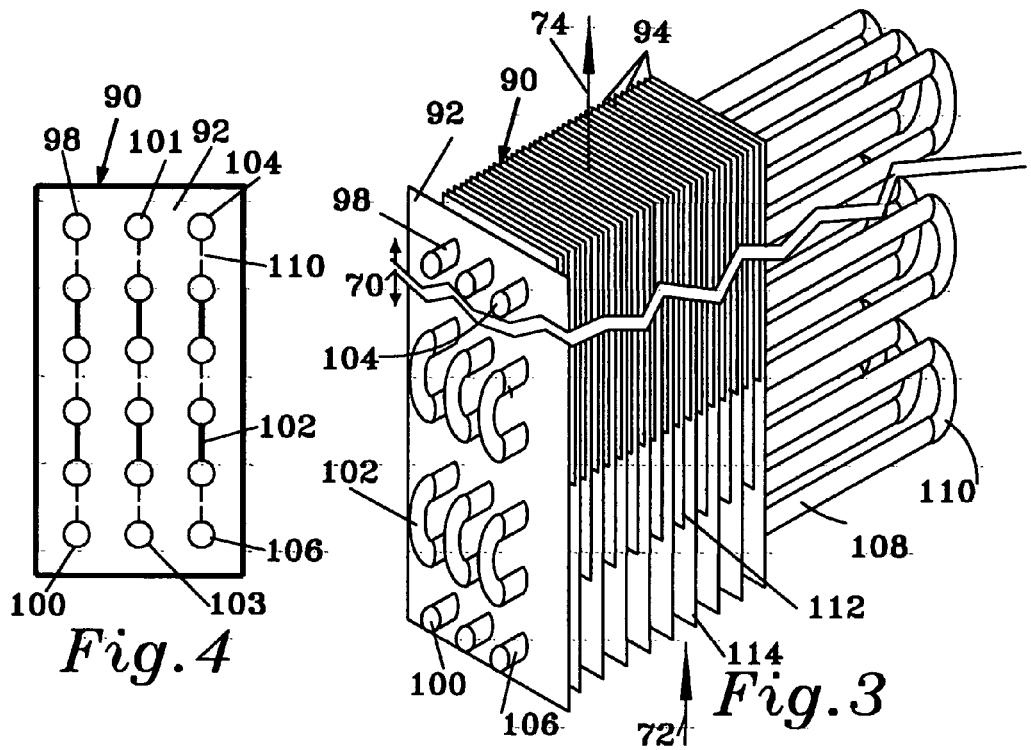
Fig.4
Fig.3
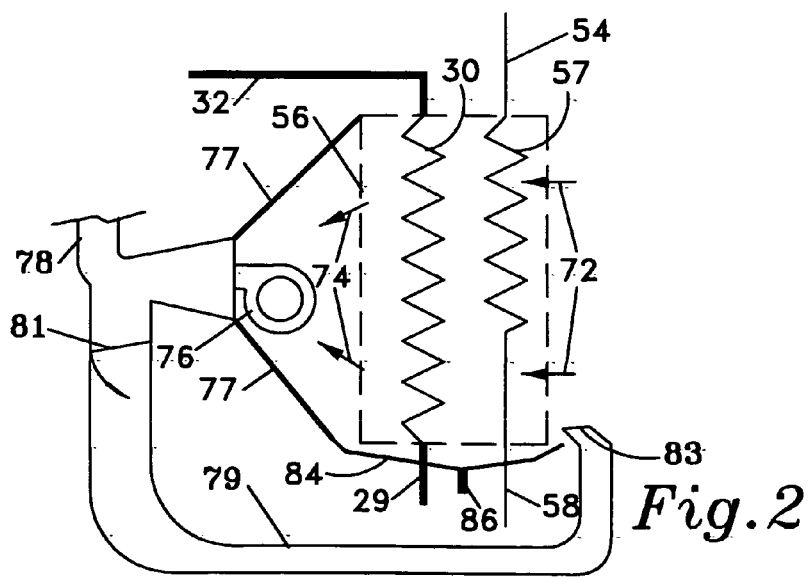
Fig.2

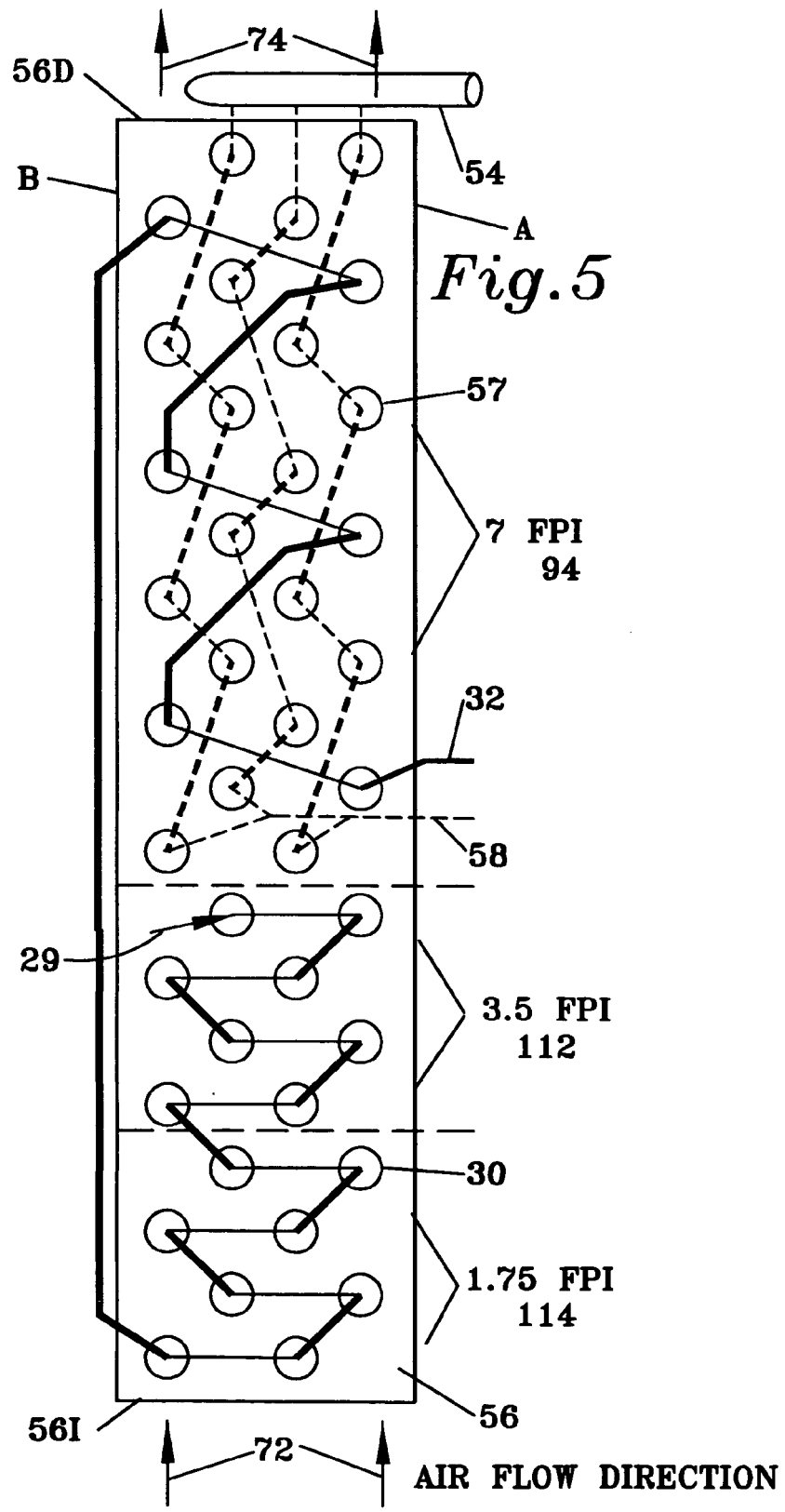

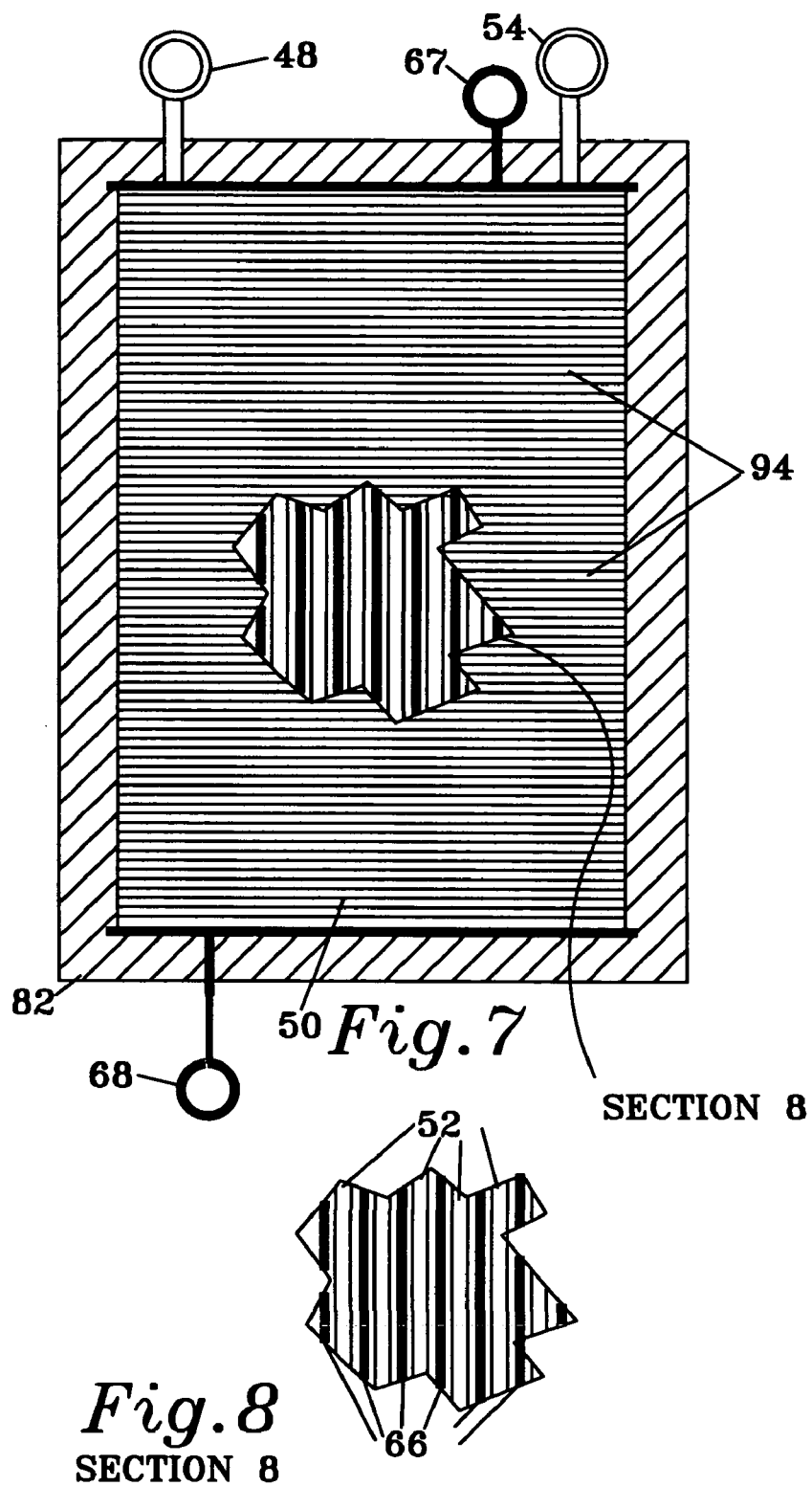

REFRIGERATED AIR DRIER WITH DEHUMIDIFICATION OF BOTH THE LOW PRESSURE AND THE HIGH PRESSURE AIR

I. CROSS REFERENCE TO RELATED APPLICATIONS

None

II. FEDERALLY SPONSORED RESEARCH

Not applicable

III. SEQUENCE LISTING OR PROGRAM

Not applicable

IV. BACKGROUND OF THE INVENTION

Field of the Invention

The invention is directed to air dryers for use in lowering the dewpoint of the delivered air of air compressors. More specifically, the invention teaches a refrigerated air dryer that employ multi-circuited finned coils to dehumidify ambient air entering the air compressor and to cool and further dehumidify high pressure air discharged by the sir compressor.

BACKGROUND

V. The Problem:

Compressed air is a primary source of controllable power used in manufacturing facilities. Air comprises two main components, oxygen, about 21 percent by volume; nitrogen, about 78 percent by volume and a number of other gases that make up the remainder in small quantities. Among these are carbon dioxide, Argon and water. Of all these only water has a saturated vapor pressure close to atmospheric pressure. When air is compressed the vapor pressure of the water vapor increases along with the vapor pressure of all the other components.

VI. However, only the water vapor is likely to condense to liquid water. Depending on the amount of water in the air entering the compressor and the temperature of the sir discharged from the compressor, the vapor pressure of the water in the compressed air may exceed its saturated vapor pressure at that temperature. Then water vapor will condense in the compressed region including pipes and mechanisms until its remaining vapor pressure equals its saturated vapor pressure (saturation pressure). Since the temperature of the air discharged from the air compressor may be quite high the corresponding saturation pressure of water at that temperature may be high enough to prevent condensation of moisture at that point. However, when the warm compressed air flows through pipes and conduits toward its point of use, the compressed air cools and the saturation pressure of water at the lowered temperature is exceeded by the partial pressure of water vapor in the compressed air. Then moisture condenses in the pipes and is carried forth to its connected equipment. The condensed moisture interferes with proper lubrication of the equipment, promotes corrosion of pipes and vessels and contaminates material intended to be pumped or agitated such as paints, food products, oils, and pneumatic tool lubricants.

VII. Solution:

There are two potential solutions. One is reduce the quantity of moisture in the ambient airstream prior to entry at the compressor (entering air). The second is to reduce the moisture content of the compressed air stream (compressed air), by further cooling the hot compressed air, separating the resulting water produced by this direct cooling, and subsequent reheat drying. The air drying is completed when entrained condensed water is purged from the system, before it reaches the plant.

VIII. A number of techniques have been proposed for accomplishing the reduction in water vapor content in the entering air. In one method the entering air is caused to traverse a shower of a water absorbing solution such as propylene glycol. The glycol is continuously regenerated by boiling some of it to remove the absorbed moisture and the reconcentrated glycol is returned to the shower. In another system the entering air is caused to traverse a segment of a rotary wheel having a mesh coated with solid moisture absorbent such as silica gel. As the wheel turns, the segment exposed to the moist entering air, having dried the air and become moist, is then exposed to a heated airstream that expel the moisture from the desiccant and then a stream of cool dry air that prepares that segment again for water absorption. Yet another air drying method employs a relatively standard type air-on, low temp. type finned coil evaporator, connected to a refrigeration system. For very low compressed air dewpoint requirements, a pair of chambers is used in dehumidifying alternating flows. This allows for continuous operation of the air compressor by alternate defrosting of the refrigerant evaporator within each chamber. The dehumidified air is then allowed to be drawn, or otherwise induced into in the compressor inlet air manifold.

IX. A common unitary device dehumidifies the compressed air stream by using a refrigerating system to receive the hot compressed air from the compressor and cool it below any temperature the air might encounter during its travels through pipes en route to the point of use. In order to contain the compressed air at the high compressed pressures, it is usual to employ heat exchanger vessels having steel shells with refrigerated tubes within the shells. Typically, the compressed air within the vessel is caused to traverse the refrigerated tubes several times by a series of cross-wise baffles within the vessel. Condensed water is collected and purged to a common atmospheric drain by a reservoir containing a float valve mechanism.

X. This invention's solution to the problem of removing moisture and its (pressure induced) water formation in the compressed air stream presented here employs a common refrigerating cycle in a dual function, thereby providing an enhanced, as well as an economical combination of the two techniques:

Entering air dehumidifying and compressed air drying.

XI. In the first dehumidification phase the refrigeration cools the entering air sufficiently to cause the saturation pressure of the water to become low enough to allow most of the moisture in the entering airstream to condense, as would a normal air-conditioning evaporator coil. Condensate flows to waste, or re-use as distilled water.

XII. In the second dehumidification phase, the compressed air discharged by the compressor is cooled in two steps, first by heat transfer with cold compressed air from the refrigerated coil and second by direct exposure the refrigerated coil itself. This now cools the compressed air sufficiently to lower the saturation temperature of the moist compressed air below the vapor pressure of the water in the compressed air, thereby causing moisture to condense out of the compressed air and be removed from the compressed system through a moisture separator and float valve.

XIII. However, unlike much of the prior art refrigerated high pressure dehumidifiers, the apparatus of the invention employs only continuous plate fin coils. An evaporator coil has a combined function of cooling and dehumidifying air entering the compressor plus simultaneously cooling precooled compressed air. The evaporator coil has two intertwined tube circuits, one for cold evaporating refrigerant and a second for compressed air. The ambient air is circulated through the fins by a fan or blower thereby cooling and dehumidifying the ambient air. The blower lightly pressurizes the dehumidified air into the compressor inlet manifold.

XIV. Prior to entry, substantial amount of moisture in the compressed air is condensed and is separated from the compressed air stream and discharge to waste via a separator vessel having a float valve or equivalent positioned within.

XV. A second finned coil, having two intertwined tube circuits, is provided for exchanging only sensible heat between the hot compressed air just discharged by the compressor and the cold compressed air having just been cooled and dried by the evaporator coil and condense separator vessel. The second coil, insulated from heat exchange with the ambient air, precools the hot, just compressed, air prior to entry to the refrigerated coil and simultaneously warms the cold compressed dehumidified air from the refrigerated coil prior to discharge to the plant. No shell and tube or tube-in-tube types of heat exchangers are employed.

Economic Advantages:

XVI. Past designs for air dryers have employed plate-type or tube-in-tube or shell and coil heat exchangers for one function and separate finned coils for other functions.

XVII. The air drier of the invention employs only common type finned coils simultaneously for both purposes, thereby enhancing dehumidification efficiency, reducing material and manufacturing costs, as well as allowing for ease and cost of field repairability.

XVIII. The use of a supplementary booster fan and its air flow arrangement allows for positive inlet air pressure into the inlet air manifold of the air compressor, as well as continuous dehumidification of the inlet air during air compressor idle or part load operation, this by the recirculated air function of the booster blower.

XIX. This supplementary booster fan in conjunction with the bypass maintains high ambient airflow rates through the coil. This helps to maintain refrigerant temperature above 34° F. and reduces the need for rapid cycling the refrigeration compressor, common in past designs, in order to prevent compressed air freezing within the evaporator.

XX. Shell-and-tube type evaporator designs limit unit operation when approaching freezing conditions of the condensate water removed from the pressurized air. This risk is even greater if the evaporator has internal air-flow directional baffles. These internal baffles are generally constructed with weep holes. These tend to freeze-over when the air compressor is partly or fully unloaded and the refrigerant compressor has not unloaded in turn. Tube-in-tube evaporators have the similar freeze-up potential. Both the tube-in-tube and the shell and tube designs are highly susceptible to tube crushing from ice building on the tubes if operated below freezing for a long periods. By contrast, in the heat exchangers of the instant invention, there can be ice formed on the fins and tubes, but the air flow velocity within the tubes is sufficiently higher, which keeps the tube passages open. Tests have shown continued operation even with evaporating temperatures as low as 20 F.

XXI. Most common air dryers have integral refrigerant compressors and air-cooled condensers in a packaged unit assembly. These have the disadvantage of discharging hot condenser air into the compressor room. By contrast, the air drier of the invention features an inexpensive air-conditioning remote type condensing unit, that can be positioned outside the machine room, and its refrigerant lines piped to the air dryer located in the equipment room.

XXII. Operation: The air drier of the invention uses a single fin coil assembly to dehumidify the entry ambient air, enhance the volume of air ingested into a positive displacement compressor and dry the outlet compressed air as well as reheat the dehumidified compressed air.

XXIII. The use of a supplementary booster fan to raise the inlet air pressure to the air compressor, thereby offsetting any pressure loss from the multi-row inlet cooling/dehumidifying coil.

XXIV. The air bypass routed from the outlet of the booster blower back to the ambient air inlet of the dehumidifier coil is under control of a relief damper. The damper opens, thereby allowing bypass, during air compressor idle or part load operation. The air bypass reduces the need for rapid cycling the refrigeration compressor.

XXV. Other attributes of this design are that it can be operated in high humidity and/or dirt laden atmospheres. The wetted surface dehumidifying coil, with its staged fin density design and its vertical-up air path orientation is least susceptible to dirt clogging from the inlet air. The cooling and dehumidification coil has a high primary-to-secondary surface ratio, resulting in high air-on dehumidification performance. This all-coil design eliminates possible damage by freezing when operated with refrigerant evaporating temperatures as low as +20 F.

Prior Art

XXVI. Gossler; U.S. Pat. No. 4,928,498 teaches a dual evaporator, dual path system for dehumidifying air entering the air compressor. Gossler runs his evaporators under freezing conditions so frost accumulates on the evaporator coils. Therefor he needs to refrigerate alternate evaporators while defrosting the other to secure continuous dehumidification.

XXVII. Gossler's coils have only a single circuit. By contrast, applicant's evaporator coils all have multiple circuits. Further, Gossler's coils all have airflow through the fins. By contrast, one of applicants' has no air flow traversing the fins. In fact, applicants' reheat finned coil is isolated so there cannot be airflow through the fins.

XXVIII. Gossler does not teach or show any blower pressurization of the air stream into the intake manifold of the compressor.

XXIX. Further, applicant maintains constant operation using only a single evaporator with concurrent airflows through the fins and through the tubes.

XXX. Huang U.S. Pat. No. 5,983,651 teaches only cooling and dehumidifying air after it has been compressed. Huang's heat exchangers are all of the shell-and-tube type. Huang does not dehumidify ambient air entering the air compressor.

XXXI. OBJECTS AND ADVANTAGES a. To provide a dual function air drier for use with air compressors.

b. To provide a refrigerated air drier employing a finned coil having a dual heat transfer purpose.

c. To provide a refrigerated air drier where one finned coil has at least two tubular fluid flow circuits and where heat is exchanged only between the fluids.

d. To provide a refrigerated air drier where a second finned coil has at least two tube circuits, one for flow of the volatile refrigerant and another for flow of compressed air, and also is subject to flow of ambient air for dehumidifying the ambient air, whereby the compressed air is directly cooled by heat transfer to the cold refrigerant via the fins and the ambient air is cooled by heat transfer with the refrigerated circuit.
e. To provide a refrigerated air drier having at least two finned coils where each coil has at least two tubular circuits for flow of fluid and where only one coil is subject to air flow traversing the coil fins.
f. To provide a refrigerated air drier having a booster fan (blower) to restore air pressure lost by passage of the air through the dehumidifier coil.
g. To provide a refrigerated air drier where more ambient air is blown through the dehumidifying coil than required by the air compressor and an air bypass is provided whereby excess air is recirculated back to the coil inlet for further dehumidification.
h. To provide a refrigerated air dryer where the refrigerated coil employs lower fin density for efficient dehumidification of ambient air and higher fin density for efficient heat transfer between refrigerant tubes and compressed air tubes.
i. To provide a refrigerated air dryer where the refrigerated coil has at least three fin densities.
j. To provide a refrigerated air dryer where the static reheat coil employs continuous plate fins at a density sufficiently high for efficient heat transfer between the cooler dehumidified air-carrying tubes of the dryer's leaving air stream and the hot discharge-air-carrying tubes of the compressor's leaving air stream.
k. To provide an air dryer that connects a remote air comprssor at both the air discharge line and inlet air manifold of the air compressor.
l. To provide an air dryer that connects to a remote refrigeration condensing unit of the commonly available air or water cooled conditioning type, requiring no specific HFC refrigerant nor operating controls.
m. To provide an air drier for air compressors having a finned coil with a refrigerated circuit and a circuit to cooling the high pressure air from the compressor discharge and where means are provided for preventing flow of ambient air through the coil.
n. To provide a refrigerated air drier especially designed and adapted for reducing the moisture content in air both entering and leaving an air compressor.

Other objects and advantages will be evident as the processes and their details are disclosed.

SUMMARY OF THE INVENTION

XXXII. A refrigerated system for air compressors adapted to dry both the ambient air entering the air compressor and the compressed air leaving the air compressor, the system employing multi circuited finned coils both for exchanging heat between a circuit and atmospheric air and for exchanging heat between circuits.

XXXIII. BRIEF DESCRIPTION OF THE DRAWINGS

FIG. 2 is a sub-set of FIG. 1 with the exception that the fan 76 is the blower type and an air bypass 79 is provided to allow for air recirculation.

FIGS. 3 and 4 illustrate fin coil construction having in-line interlaced tubes and varying fin densities in sections of a single coil.

FIG. 5 is an end view of the coil 56 of FIG. 1 showing one type of circuiting for both cooling and dehumidifying ambient air and for cooling and dehumidifying compressed air.

FIG. 7 is a front view of coil 50 showing the very close fin spacing for effective tube to tube heat transfer.

FIG. 8 is a section 8 of a portion of FIG. 7 showing the interlaced tubes.

XXXIV. DEFINITIONS

Ambient air is the air we breath that is also the source of air to the air compressor.

DETAILED DESCRIPTION OF THE INVENTION

Figure 1:
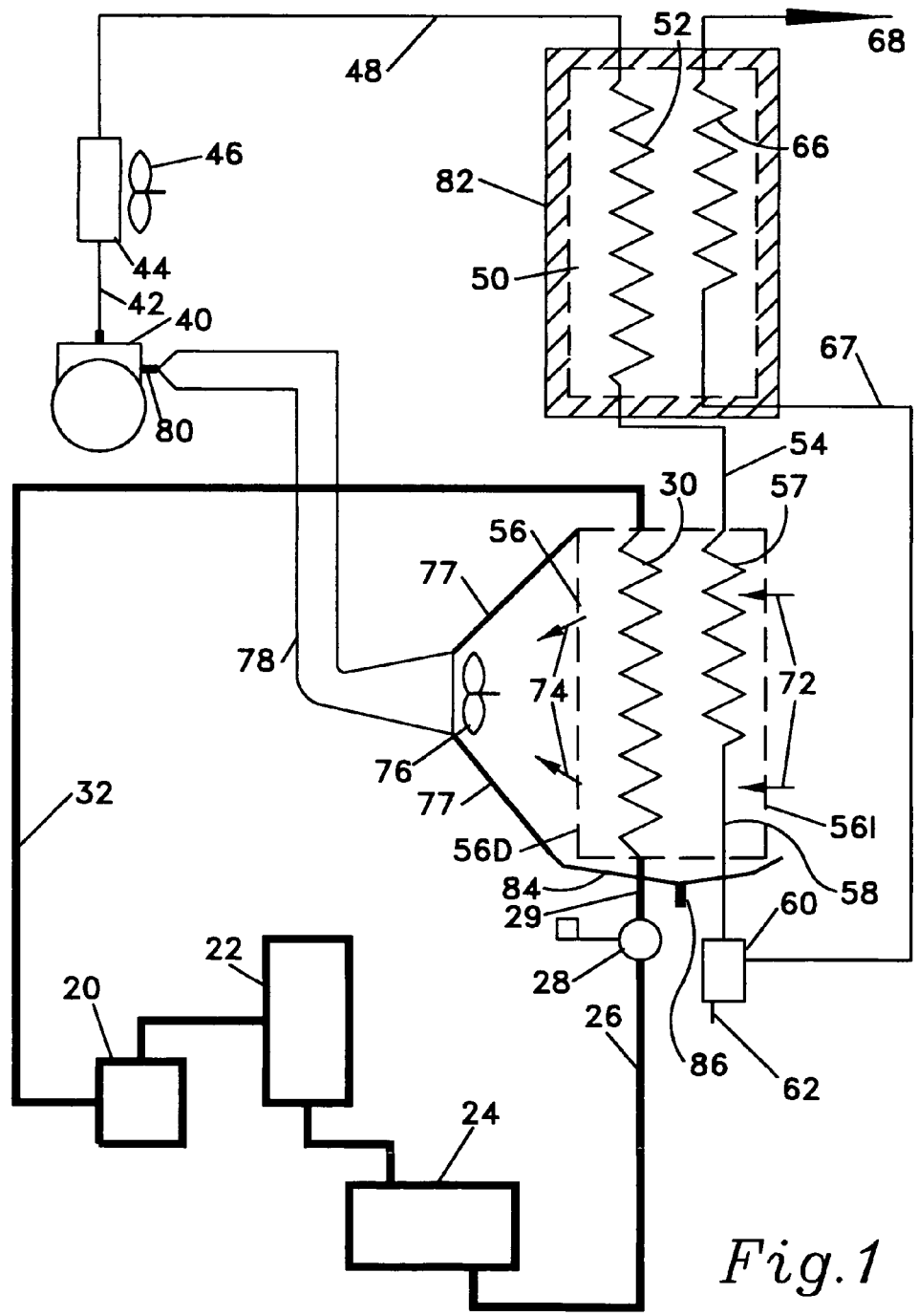
FIG. 1 shows a complete piping schematic of the compressed air, the ambient air and the refrigeration circuit.

XXXV. Referring now to FIG. 1 there is shown a schematic diagram where air compressor 40 has inlet 80 for ambient air and compressed air discharge 42. While the outline of air compressor 40 is in the form of a positive displacement reciprocating type compressor, any type compressor such as piston, centrifugal, screw or scroll is intended. Further, while a single stage compressor is shown, the invention is applicable also to multistage compressors, with or without intercooling. An optional desuperheater coil 44 having fan 46 is shown for the purpose of cooling the hot compressed air leaving compressor discharge 42 to a temperature near room or ambient temperature.

XXXVI. Cooled compressed air flows from desuperheater 44 to a heat exchanger 50 having first tube circuit 52 and second tube circuit 66, where the medium for transferring heat between the first and second tube circuits is a multiplicity of fins. While prior finned coils have been used to transfer heat to or from air to a tubular circuit traversing the fins, finned coil 50 is provided with enclosure 82 that excludes and prevents the circulation of ambient air, thereby ensuring that heat is transferred substantially exclusively between the first tubular circuit 52 and the second tubular circuit 66. This substantially exclusive transfer of heat between the two circuits and the fluids flowing therein is substantially the same as the heat transfer provided and observed in a shell and tube or shell and coil heat exchangers, formerly employed for this purpose. The circuiting details of coil 50 are shown and will be discussed in connection with FIGS. 6, 7 and 8.

XXXVII. Compressed air circuit 52 receives the warm compressed air (or hot compressed air if desuperheater 44 is omitted) from conduit 48 and is cooled by direct heat transfer with the cooled compressed air flowing through circuit 66. The cool compressed (dry or dehumidified, as explained below) air entering circuit 66 is warmed (reheated) by having its heat transferred to the warm compressed air flowing in circuit 52. The now warmed, dry, compressed air is discharged via outlet 68 to its intended uses. While there is an advantage to discharging warm compressed air to the system, heat exchanger 50 has a more important function, that of precooling the warm compressed air before it enters its dehumidification stage described below.

XXXVIII. Examining now coil 56 and its related elements, we see that a refrigeration system having compressor 20 is arranged and positioned to cool a first tube circuit 30 in coil 56. Compressor 20 is part of an enclosed refrigeration circuit employing a volatile refrigerant such as HFC-134a, R-410A or CFC-22. The compressor 20 withdraws refrigerant vapor from its cooling or evaporator coil 30 via suction line 32 and compresses it and delivers the compressed refrigerant vapor to condenser 22 where the refrigerant vapor is condensed to a liquid and stored temporarily in receiver 24. The liquid refrigerant in receiver 24 flows as required through liquid line 26 to expansion valve 28 where its pressure is reduced to a saturated temperature of 25 F. to 40 F. The cold refrigerant flows into coil 30 via its inlet 29. The refrigerant evaporates in coil 30, cooling it.

XXXIX. Coil 30 is in heat transfer contact with both compressed, high pressure air and low pressure (ambient) air. Moist ambient air 72 is drawn upwards through the ambient air inlet face 56I of coil 56, thereby traversing the cold evaporator tube circuit 30 positioned therein. The moist ambient air 72 is cooled and dehumidified by its contact with tube circuit 30 and its related fins 114, 112 (FIG. 3). Ambient air, having traversed cold tube circuit 30 of coil 56 is discharged from the ambient air discharge face 56D of coil 56 as cooled, dehumidified airstream 74. Moisture condensed from airstream 72 drops off coil 56 into drainpan 84 and flows to waste or other uses as distilled water via drain outlet 86.

XL. Housing 77 that includes drainpan 84 directs airstream 72/74 both over coil 56 and into blower fan 76. Blower fan 76 has the purpose of restoring any slight pressure lost by the friction of the air flowing through the fins of coil 56 and ductwork 78 plus an 0.05 to 0.10 inch water pressure increment. Blower 76 may be of any type suited to its purpose including propeller, centrifugal or squirrel cage. The power to drive fan 76 is provided by a motor, not shown. Dehumidified airstream 74 then flows through conduit 78 to ambient air inlet 80 of air compressor 40 where it is compressed.

XLI. Referring again to coil 56, attention is drawn to second circuit 57 which receives cooled air via conduit 54 from tube circuit 52 in coil 50. The cooled compressed air flowing through second circuit 57 is further cooled by direct heat exchange with cold evaporator coil 30. This further cooling causes most of the water vapor remaining mixed with the compressed air to be condensed to liquid water which is separated from the cold compressed air in separator 60 and discharged to waste or use via outlet 62 of separator 60. Typically, separator 60 is provided either with an internal or an external float mechanism (not shown) that senses the level of accumulated water within separator 60 and opens to allow the condensed water to leave separator 60 through outlet conduit 62.

XLII. FIG. 2 displays coil 56 and housing 77 of FIG. 1 but with fan 76 shown as centrifugal blower type. Fan 76 discharges into duct 78. Duct 78 is provided with branch 79 that connects and allows air to flow from the outlet 83 of duct 78 to the ambient air inlet of coil 56. Positioned in branch or bypass duct 79 is spring loaded or counterweighted damper 81 that is biased to open with the airflow demand of the air compressor 40 is less than the quantity of air provided by blower 76. Under these air bypassing conditions when damper 81 is open, the already cooled and dehumidified air 74 from the air discharge of coil 57 is recycled through coil 57 it performs two desirable functions: first it is further cooled and dehumidified by the refrigerated circuit 30 and it improves the cooling and dehumidification of compressed air flowing in circuit 57.

XLIII. Referring now to FIG. 3, coil 56 is constructed to best use the mechanically refrigerated cooling circuit 30 both to cool and dehumidify the moist ambient airstream 72 and to cool and further dehumidify the compressed airstream flowing in second tube circuit 57. In order to secure this effect coil 56 is constructed with three fin densities or numbers of fins per inch. The coil in FIG. 3 is designated 90, since it is not identical with coil 56 of FIG. 1 and is provided to illustrate airflow through a coil having a varied fin density. Coil 90 has portion 114 having lowest fin density, typically 1.75 fins per inch (fpi). Positioned immediately adjacent coil portion 114 in the direction of airflow is coil portion 112 having 3.5 fpi. Broken portion 70 is provided to illustrate that the high fin density area 94 may be extended or shortened, depending on design needs.

XLIV. In FIG. 4 is a front elevation representation of the tube circuiting shown in FIG. 3. There the heavier lines 102 represent the visible return bends at the near coil end and the thinner broken lines between tubes 110 represent the direction of the return bends at the far end of the coil. In FIG. 5 this system of representing the position of the return bends at the near and far ends of the coil are employed.

XLV. In FIG. 5 the coil portions 114 and 112 have only tubes belonging to circuit 30 within which cold volatile refrigerant flows. These coil portions are primarily directed to the function of dehumidifying entering airstream 72 by cooling it. The condensate therefrom flowing down over the portion 114 and finally dropping into drainpan 84. Finally, the cooled and dehumidified air flows over finned section 94. Finned section 94 has the highest fin density, typically 7 fins per inch. The high fin density provides the most highly thermally conductive path for heat to flow from the warm compressed air flowing in circuit 57 to the cold refrigerant circuit 30 both of which are present in this high fin density area. It is important to note that it is not the intent of this disclosure to claim that the particular fin densities of 1.75, 3.5 and 7 are critical. In fact, depending on the expected humidity of the entering air stream 72 and the fin materials, e.g. steel, copper or aluminum, fins of various dimensions, thicknesses and densities will be used. However, it is intended to identify here that the fin densities in the direction of air flow within coil 56 increase from the entering air 72 face to the discharge air 74 face. An actual coil best shown in FIG. 9 would have a series of the coil sections of FIG. 5 placed side by side to provide a larger entering air face area.

Figure 6:
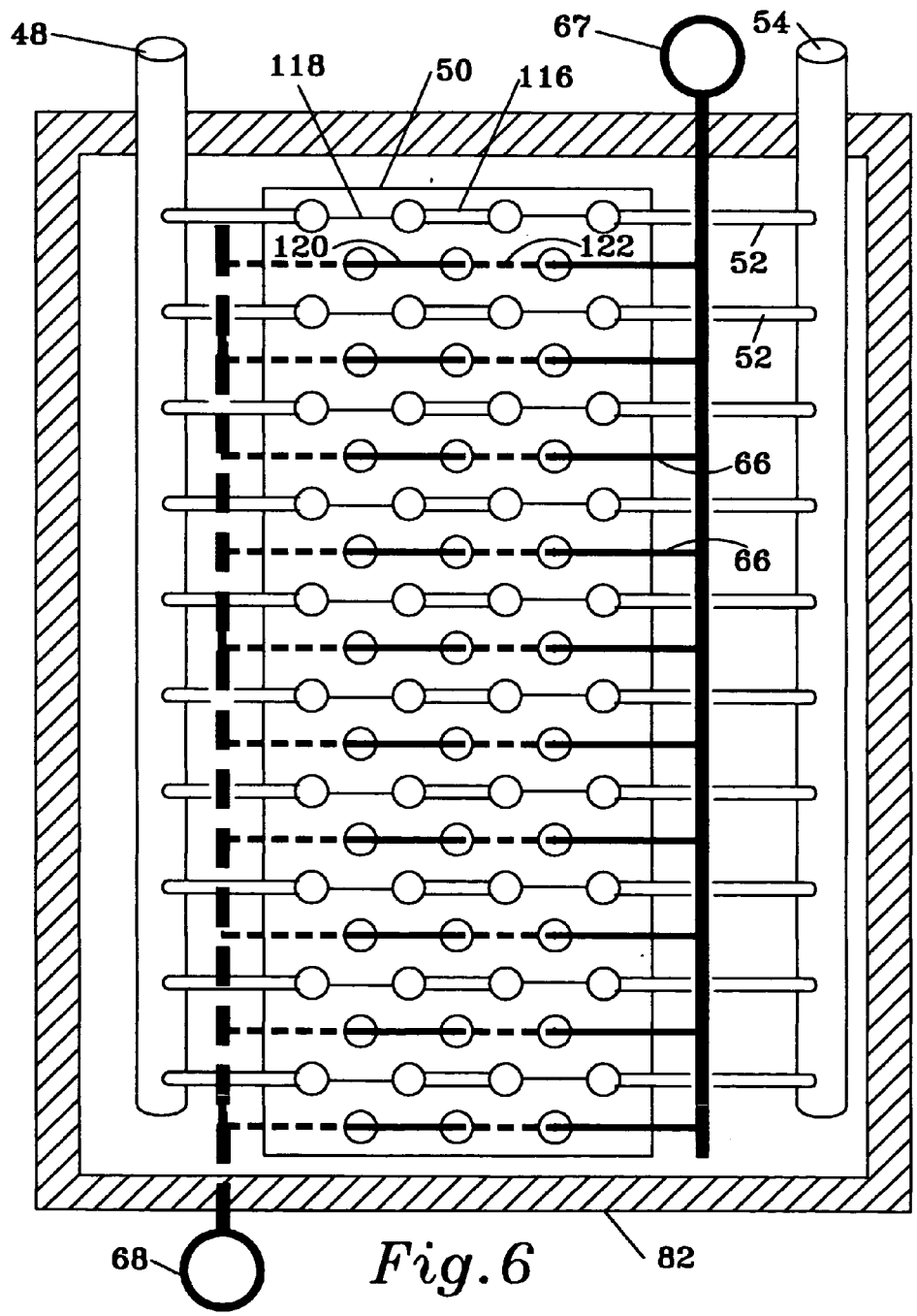
FIG. 6 is an end view of the compressed air reheat coil coil 50 of FIG. 1.

XLVI. FIG. 6 displays in a sectional view of the near-end of coil 50, a preferred circuiting for the coil 50 of FIGS. 1, 7, 8, 9, 10 and 11. The bold lines represent coil 66 carrying compressed air than has been cooled in coil 56. The dashed bold lines 122 relate to tubing and return bends of circuit 66 positioned at the far end of coil 50. The solid lines 120 relate to tubing and return bends of circuit 66 positioned at the near end of coil 50. Tubing connections 67 and 68 correspond to connections for circuit 66 having the same numbers in FIG. 1. Coil connections 48 and 54 correspond to connections for circuit 52 having the same numbers shown in FIG. 1. In FIG. 6 the double tubing lines 116 represent return bends at the near end of coil 50. The single thin lines 118 represent return bends at the far end of coil 50. The intent of the circuiting arrangement illustrated in FIG. 6 is to provide a short heat transfer path through the fin material 94 (FIG. 3) between the cold compressed air leaving circuit 57 in coil 56 and the warm compressed air leaving air compressor 40 via conduit 48.

XLVII. FIG. 7 is a section across the face of coil 50 showing the close fin density and a sectional view 8 shown as FIG. 8 provided for the purpose of showing the interior tubing, the bold lines 66T representing the tubes of coil circuit 66 (FIG. 1 and 52T) representing the tubes of coil circuit 52 (FIG. 1) in juxtaposition.

Figure 9:
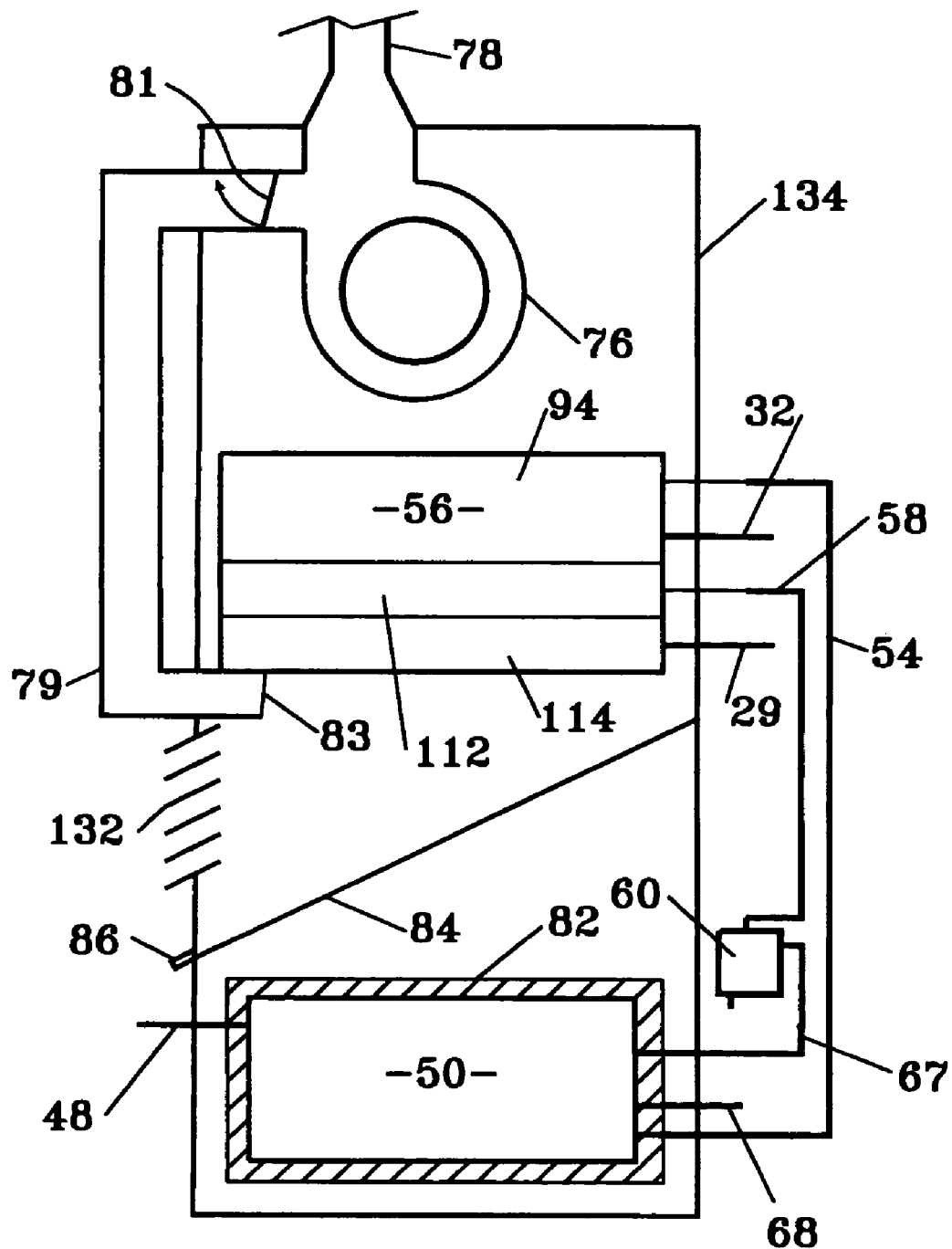
FIG. 9 is a side elevation of one possible design of an integrated assembly having insulated heat exchanger 50 at the bottom of the casing and having all the elements of the invention.

XLVIII. FIG. 9 is a elevational view illustrating one position of the various elements of a complete assembly. In FIG. 9 there is housing 134 enclosing the elements of the invention. Neither the refrigerating compressor nor the air compressor are shown but it is intended that these be provided as illustrated and described in connection with FIG. 1. Coil 56 with its four connections and interconnecting conduits corresponding to the piping schematic of FIG. 1 are shown. Coil 56 is illustrated having a sequence of fin densities, 112, 112 and 94 and is positioned above drain pan 84 having its drain outlet 86. Coil 56 is formed of a multiple of the coils and tube circuits of FIG. 5 positioned with side A touching side B and actually manufactured with continuous fins over the coil width. Blower 76 is positioned above coil 56 and discharges cooled and dehumidified air to conduit 78. Bypass conduit 79 is shown positioned outside enclosure 134, but, depending on component and enclosure sizes and orientations could be positioned within enclosure 134. Biased damper 81 is shown positioned to control flow through bypass 79. While spring biasing is described, biasing toward the closed position could be accomplished by weights or electronic means based on external pressure differential sensors. Inlet louvers are provided to guide the inlet airstream and to provide an attractive appearance. An inlet air filter, while not shown, should be provided positioned in the inlet air stream to remove dust and airborne matter that could clog the fins pof coil 56.

XLIX. Fully enclosed finned coil 50 having first and second tube circuits 52 and 66 (FIG. 1) is positioned under the drainpan 84. The other components and conduits and connections are as identified in FIG. 1.

Figure 10:
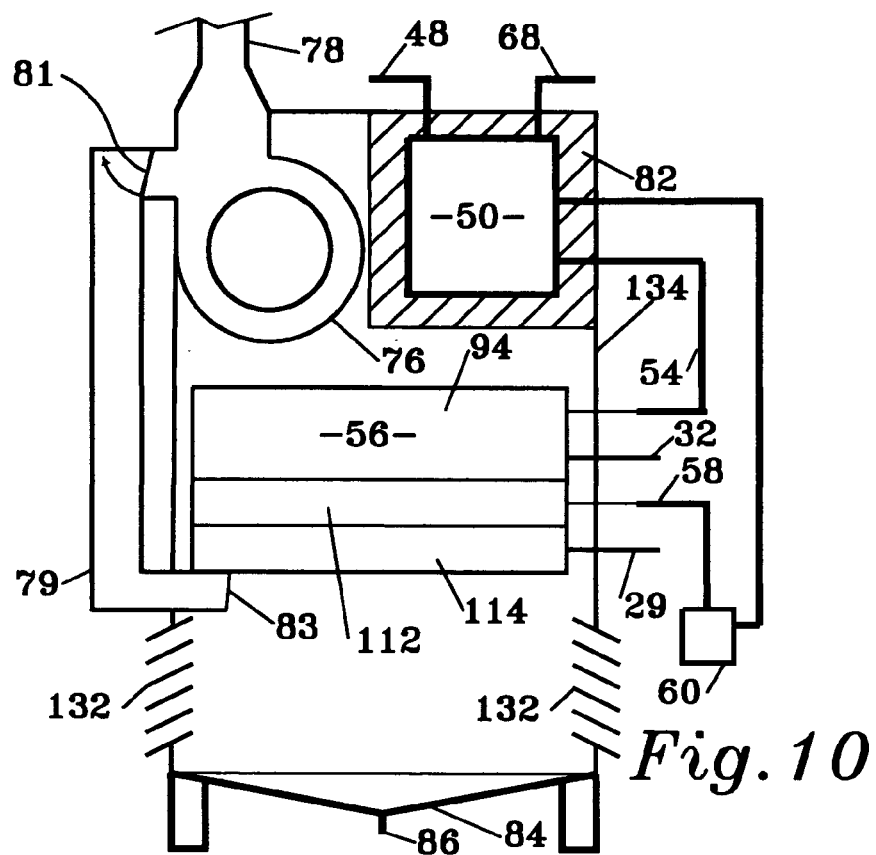
FIG. 10 is a side elevation of a second possible design of an integrated assembly having all the elements of the invention and where the insulated heat exchanger is at the top of the casing. Both FIGS. 9 and 10 display the air inlet louvers in a lower portion of the cabinets.

L. A similar but more compact construction is shown in FIG. 10 where coil 50 is positioned at the top of the enclosure 134 adjacent blower 76.

Figure 11:
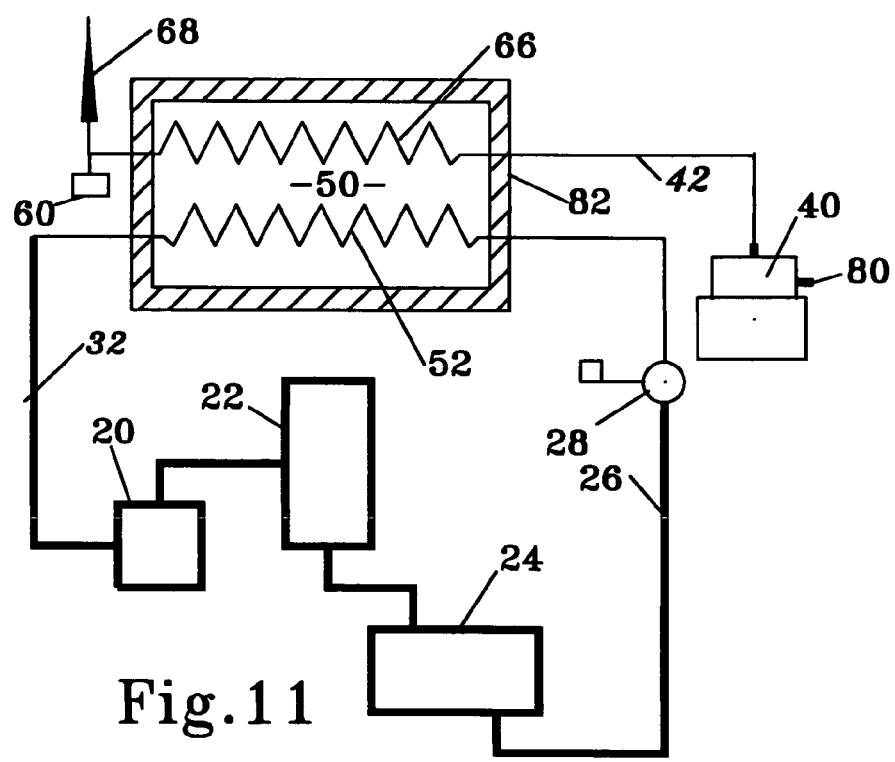
FIG. 11 is a schematic diagram of a finned coil having two independent flow circuits, a first circuit for the flow of cold refrigerant and a second circuit for flow of compressed air from the discharge of an air compressor and a compression type refrigeration system for refrigerating the first circuit.

LI. FIG. 11 displays a single coil application of coil 50. In FIG. 11 there is shown a refrigerating system similar to that shown in FIG. 1 with the exception that the evaporator circuit is now circuit 52 of coil 50. The refrigerating system includes compressor 20, condenser 22 receiver 24 liquid line 26, expansion valve 28 evaporator tube circuit 52. Tube circuit 66 still conveys compressed air, except it receives the compressed air either directly from air compressor 40 or via a desuperheater 44 (FIG. 1). A water separator 60 with float mechanism not shown, is provided and the cold compressed dehumidified compressed air flows to the user from discharge conduit 68. While this system is not quite as efficient as that of FIG. 1, it can provide the basis for a compact integral low cost system that includes the complete refrigeration system.

LII. From the foregoing description, it can be seen that the present invention comprises an unusual and unobvious construction for heat exchangers and design for a poly function air dehumidifier/drier for air compressors. It will be appreciated by those skilled in the art that changes could be made to the embodiments described in the foregoing description without departing from the broad inventive concepts thereof. It is understood, therefore, that this invention is not limited to the particular embodiment or embodiments disclosed, but is intended to cover all modifications which are within the scope and spirit of the invention as claimed and equivalents thereof.

We claim:

1. An air drier for an air compressor, said air compressor having an inlet for receiving ambient air and an outlet for discharging compressed air, said air drier comprising;
   a first fin coil for cooling and dehumidifying ambient air, said first coil having an ambient air inlet for receiving ambient air and an ambient air outlet for discharging ambient air; said first coil having first and second intertwined tube circuits,
   said first tube circuit comprising means for conveying refrigerated fluid for cooling said ambient air and second tube circuit, said second tube circuit having an inlet and an outlet, said second tube circuit comprising means for receiving compressed air though its inlet, exchanging heat with said first tube circuit and delivering cooled, dehumiidified compressed air through its outlet.

2. An air drier as recited in claim 1 further providing that said first fin coil includes a first fin zone having lower fin density, said first fin zone being positioned at said ambient air inlet to receive ambient air.

3. An air drier as recited in claim 2, further providing that said first fin coil includes a second fin zone of highest fin density, said second fin zone being positioned at the ambient air discharge of said first fin coil to discharge cooled and dehumidified ambient air.

4. An air drier as recited in claim 3 further including a third fin zone having a fin density intermediate to the fin density of said first and second fin zones, said third fin zone being positioned to receive ambient air discharged by the first fin zone and to discharge ambient air to the second fin zone.

5. An air drier as recited in claim 4 further providing that a majority of the tube in the first and third fin zones are first circuit tubes.

6. An air drier as recited in claim 5 further providing that a majority of the tubes in said second fin zone are second circuit tubes.

7. An air drier as recited in claim 6 further including means for conveying to the compressor inlet cooled and dehumidified ambient air leaving the second fin zone, and further providing that the means for conveying dehumidified air to the compressor inlet includes fan means for increasing the pressure of air conveyed to the compressor inlet.

8. An air drier as recited in claim 7 further providing that said conveying means includes duct means for conveying cooled and dehumidified air from the fan means to the compressor inlet.

9. An air drier as recited in claim 8, further providing bypass means for allowing flow between said duct means and the ambient air inlet of the first coil.

10. An air drier as recited in claim 9 further providing means for allowing and preventing flow through said bypass means.

11. An air drier as recited in claim 10 further providing that the allowing and preventing means is a biased damper.

12. An air drier as recited in claim 1 further providing a second fin coil having third and fourth intertwined tube circuits, each positioned in heat transfer relation to the other, said third tube circuit having an inlet and an outlet and said fourth tube circuit having an inlet and an outlet, and means for preventing ambient air flow through the fins of the second coil.

13. An air drier as recited in claim 12 further providing that said third circuit comprises means for receiving compressed air from the air compressor discharge and supplying compressed air to the second tube circuit inlet.

14. An air drier as recited in claim 13 further providing that said fourth tube circuit inlet comprises means for receiving cooled compressed air from said second tube circuit outlet for traversing said fourth tube circuit, whereby the compressed air from the compressor discharge is cooled in said third tube circuit and the compressed air traversing said fourth tube circuit is warmed.

15. A refrigerated compressed air drier comprising a finned coil having a first circuit having an inlet and an outlet and a second circuit having an inlet and an outlet, said first and second circuits being in heat transfer communication within said finned coil, means for supplying a refrigerated fluid to said first circuit inlet, means for supplying a flow of compressed air having a water vapor component to said second circuit inlet, whereby the refrigerated first circuit cools the flow of compressed air traversing said second circuit, thereby causing a portion of the water vapor component to condense to a liquid, and means for preventing a flow of air over or through the fins of said finned coil.

16. A refrigerated air drier as recited in claim 15, further providing that the refrigerated fluid supplied to the first circuit inlet is a volatile refrigerant liquid and that vapor from evaporation of the volatile liquid refrigerant flows from said first circuit outlet.

17. A refrigerated air drier as recite in claim 16, further providing a refrigerating compressor means for removing volatile vapor from said first circuit outlet and refrigerant condenser means for condensing volatile refrigerant vapor to a volatile liquid refrigerant and means for supplying said volatile liquid refrigerant to the inlet of said first circuit.

\* \* \* \* \*